United States Patent
Good

(10) Patent No.: US 9,602,557 B2
(45) Date of Patent: *Mar. 21, 2017

(54) SYSTEMS AND METHODS OF COMMUNICATION USING A MESSAGE HEADER THAT INCLUDES HEADER FLAGS

(71) Applicant: Wowza Media Systems, LLC, Evergreen, CO (US)

(72) Inventor: Charlie Good, Cincinatti, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 821 days.

This patent is subject to a terminal disclaimer.

(21) Appl. No.: 13/652,298

(22) Filed: Oct. 15, 2012

(65) Prior Publication Data

US 2014/0108524 A1     Apr. 17, 2014

(51) Int. Cl.
   *G06F 15/16*     (2006.01)
   *H04L 29/06*     (2006.01)
   *H04N 21/643*    (2011.01)

(52) U.S. Cl.
   CPC ........ *H04L 65/403* (2013.01); *H04L 65/4084* (2013.01); *H04L 65/608* (2013.01); *H04N 21/643* (2013.01)

(58) Field of Classification Search
   CPC ........... H04L 29/06102; H04L 29/0653; H04L 29/0863; H04L 49/9042; H04L 69/161
   See application file for complete search history.

(56) References Cited

U.S. PATENT DOCUMENTS

| | | | |
|---|---|---|---|
| 7,170,896 B2 * | 1/2007 | Battin | 370/401 |
| 7,185,105 B2 * | 2/2007 | Chang et al. | 709/236 |
| 7,272,658 B1 | 9/2007 | Edelman et al. | |
| 7,587,509 B1 | 9/2009 | Edelman et al. | |

(Continued)

FOREIGN PATENT DOCUMENTS

| | | |
|---|---|---|
| WO | 2008079886 A1 | 7/2008 |
| WO | 2009052118 A3 | 4/2009 |

OTHER PUBLICATIONS

Adobe Systems; RTMP Specification License; Apr. 2009; http://www.adobe.com/devnet/rtmp/.; 70 pages.

(Continued)

*Primary Examiner* — Ninos Danabed
*Assistant Examiner* — Thomas Richardson
(74) *Attorney, Agent, or Firm* — Toler Law Group, PC

(57) ABSTRACT

A method includes determining, at a first computing device, whether data to be communicated to a second computing device includes media data or protocol data. The method also includes, in response to determining that the data includes media data, generating a message header and a message body based on the media data. The message header includes a header flags portion and a header fields portion, and the header flags portion includes at least one flag having a value that indicates a length of a corresponding field of a plurality of fields of the header fields portion. The method further includes encapsulating the message header and the message body into a message and inserting the message into a media stream to be transmitted from the first computing device to the second computing device in accordance with a media communication protocol.

20 Claims, 9 Drawing Sheets

(56) References Cited

U.S. PATENT DOCUMENTS

| | | | |
|---|---|---|---|
| 7,734,909 B1* | 6/2010 | Roush | H04L 63/0227 709/203 |
| 7,961,878 B2 | 6/2011 | Whillock et al. | |
| 8,051,287 B2 | 11/2011 | Shetty et al. | |
| 8,065,426 B2 | 11/2011 | Edelman et al. | |
| 8,205,076 B1 | 6/2012 | Shetty et al. | |
| 8,245,033 B1 | 8/2012 | Shetty et al. | |
| 8,284,932 B2 | 10/2012 | Whillock et al. | |
| 8,285,867 B1 | 10/2012 | Edelman et al. | |
| 8,443,120 B2 | 5/2013 | Lu et al. | |
| 2002/0186692 A1* | 12/2002 | Chang et al. | 370/389 |
| 2005/0058078 A1* | 3/2005 | Jung et al. | 370/241 |
| 2005/0147384 A1 | 7/2005 | Sakurai et al. | |
| 2007/0214229 A1* | 9/2007 | Millington et al. | 709/208 |
| 2010/0027566 A1* | 2/2010 | Kim et al. | 370/477 |
| 2010/0216500 A1* | 8/2010 | Shatsky | 455/518 |
| 2010/0290478 A1* | 11/2010 | Xia et al. | 370/401 |
| 2011/0078782 A1* | 3/2011 | Chan | H04L 63/0209 726/13 |
| 2011/0302417 A1 | 12/2011 | Whillock et al. | |
| 2012/0023255 A1 | 1/2012 | Edelman et al. | |

OTHER PUBLICATIONS

Wikipedia; Real Time Messaging Protocol; retrieved on Oct. 3, 2012 from "http://en.wikipedia.org/w/index.php?title=Real_Time_Messaging_Protocol&oldid=515452950"; 10 pages.

* cited by examiner

SYSTEMS AND METHODS OF COMMUNICATION USING A MESSAGE HEADER THAT INCLUDES HEADER FLAGS

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

Typically, a streaming protocol is used to stream content from a content source to a destination device. One example of a streaming protocol is real time messaging protocol (RTMP). U.S. Pat. Nos. 7,272,658, 7,587,509, 8,065,426, 7,961,878, and 8,051,287 are associated with RTMP and/or RTMP encrypted (RTMPE). In RTMP, streams are communicated using fragments called "chunks." Typically, a first chunk of a stream has a complete header, and subsequent chunks may have shorter headers that eliminate header information that has not changed relative to the first chunk. Based on how much redundant information is omitted, chunks may be classified as one of multiple types of chunks, and a chunk type may be included in each chunk header. When a packet is divided into multiple chunks, each chunk may have a chunk header. Further, a transmitting device may be responsible for determining what type of chunk is being transmitted, so that the chunk type field may be properly coded. Thus, existing streaming protocols may occupy an unacceptably high amount of overhead or involve an unacceptably large amount of control processing. The high overhead or control processing may lead to degradation in stream quality (e.g., when a large number of packets are to be communicated, such as for high-definition content, or when a large number of destination devices are simultaneously streaming the same content).

SUMMARY

A media communication protocol (e.g., a real-time media streaming protocol) and systems and methods of communicating in accordance with the protocol are disclosed. Media messages formatted in accordance with the protocol may include a message header and a message body (e.g., serialized binary data). The message header may include a message flags portion and a message fields portion. The message flags portion may include single-bit or multi-bit flags that indicate a length of a corresponding field in the message fields portion. For example, when a stream identifier (ID) flag has a first value (e.g., 0), a corresponding stream ID field in the message fields portion of the message header may have a first length (e.g., 1 byte). However, when the stream ID flag has a second value (e.g., 1), the stream ID field may have a second length (e.g., 4 bytes). The use of message flags may thus enable the use of variable length header fields, which may decrease an overall amount of overhead involved in transmitting the media messages. Media messages may include separate channels for separate kinds of data (e.g., separate audio, video, and text channels) and/or may include a channel that interleaves different kinds of data (e.g., a single channel that carries interleaved audio, video, and text).

The described media communication protocol may support protocol messages. Protocol messages may be transmitted periodically to communicate status and/or accounting information (e.g., number of packets sent since last protocol message, number of bytes sent since last protocol message, etc.). The status/accounting information may be used to determine an overall "health" of the media stream and/or underlying connection. Further, the described media communication protocol may be bidirectional. Thus, a single connection (e.g., transmission control protocol (TCP)) connection may be used for bidirectional point-to-point communication between devices, such as between two servers and/or between a server and a user device.

DETAILED DESCRIPTION

Figure 1:
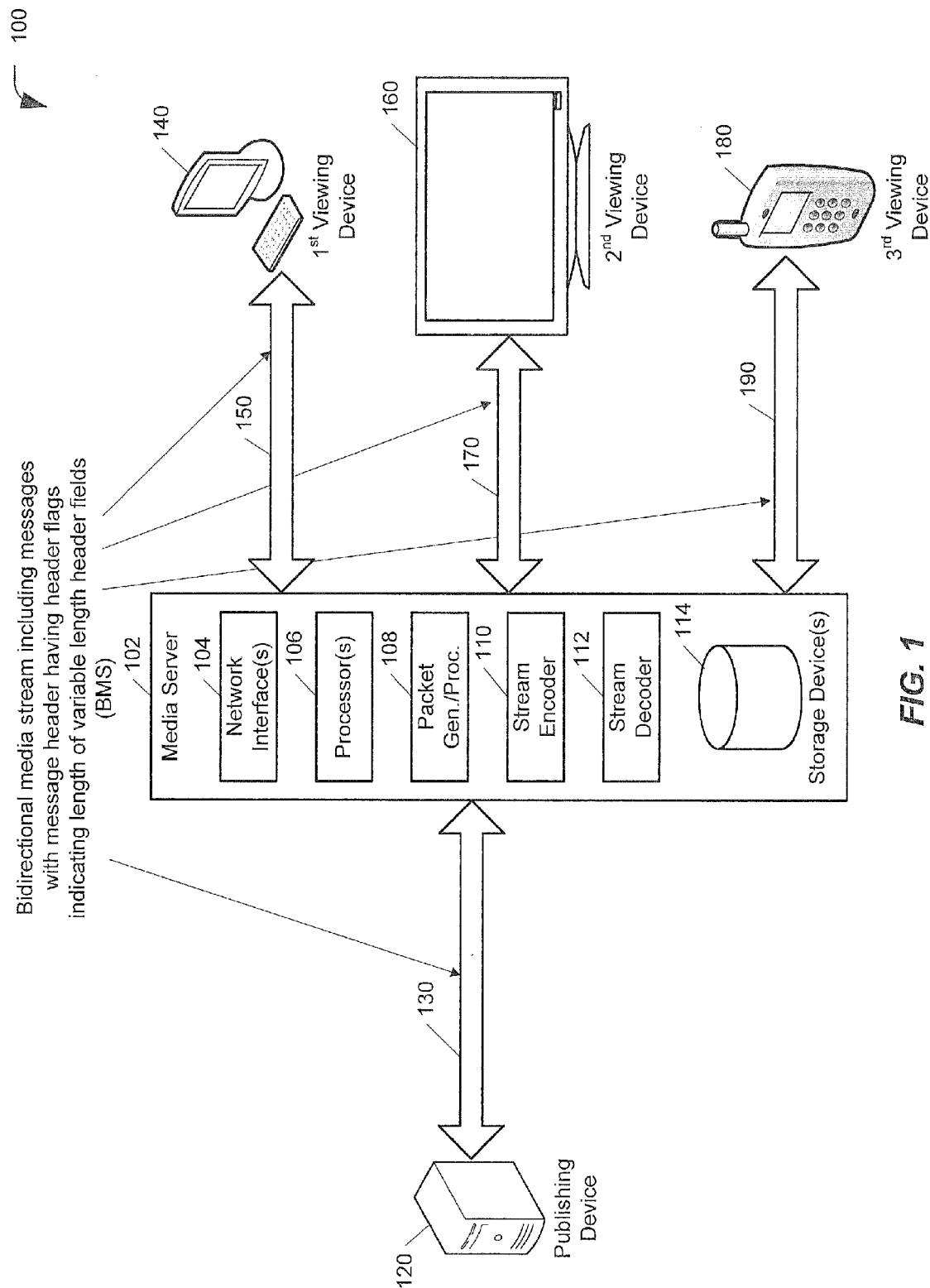
FIG. 1 is a diagram to illustrate a particular embodiment of a system that supports communication using message headers that include header flags.

FIG. 1 is a diagram to illustrate a particular embodiment of a system 100 that supports communication using message headers that include header flags. The system 100 includes a media server 102 that is communicably coupled to one or more publishing devices (e.g., an illustrative publishing device 120) and to one or more viewing devices (e.g., illustrative viewing devices 140, 160, and 180). The media server 102 may receive one or more media streams from the publishing device 120 and may provide one or more media streams to the viewing devices 140, 160, and 180.

It should be noted that although various embodiments described herein reference "viewing" devices, this is for illustration only. The described techniques may also be used with non-visual media streams (e.g., audio streams provided to "listening" or "playback" devices). Each media stream that is received by the media server 102 and each media stream that is transmitted by the media server 102 may be represented according to a media communication protocol. For example, the media communication protocol may support real-time streaming of audio, video, and/or non-audio/non-video (e.g., textual) data. As further described herein, messages in the media streams may include a message header, where the message header has a header flags portion and a header fields portion, and where a value of at least one header flag indicates a length of a corresponding header field. Moreover, as further described herein, a media stream may include one or more channels, including one or more channels dedicated to a particular type of data (e.g., separate audio and video channels) or one or more channels that interleave different types of data (e.g., a single channel that includes interleaved audio and video data).

The media server 102 may include one or more network interface(s) 104. For example, the network interface(s) 104 may include input interface(s) and output interface(s) that are configured to receive data and to send data, respectively. In a particular embodiment, the network interface(s) 104 may be wired and/or wireless interfaces that enable the media server 102 to communicate data via a network, such as the Internet. For example, the network interface(s) 104 may include an Ethernet interface, a universal serial bus (USB) interface, a wireless interface compatible with an Institute of Electrical and Electronics Engineers (IEEE) 802.11 protocol, etc.

The media server 102 may also include one or more processors 106 and various components that are executable by the processor(s) 106. As used herein, the term "media server" may refer to software application(s) that perform media serving or processing, hardware systems (e.g., servers) that support or perform media serving and processing, or any combination thereof. Thus, various operations described with reference to a media server may be implemented using hardware, software (e.g., instructions executable by the processor(s) 106) or any combination thereof.

In a particular embodiment, the media server 102 may include a packet generator/processor 108, a stream encoder 110, and a stream decoder 112 that are executable by the processor(s) 106. For example, the packet generator/processor 108, the stream encoder 110, and the stream decoder 112 may be implemented using one or more Java classes that are executable by a Java Virtual Machine (JVM) executing on the processor(s) 106. The media server 102 may also include one or more storage devices 114. The storage device(s) 114 may include volatile and/or non-volatile memory and may store or cache media stream content for subsequent retrieval.

The stream encoder 110 may be configured to encode or to transcode a media stream. For example, the stream encoder 110 may generate media data (e.g., audio, video, and/or text data) to be sent to one or more particular destination devices. The stream encoder 110 may perform media processing functions such as format conversion, aspect ratio conversion, bitrate conversion, resolution conversion, color space conversion, etc. An output stream generated by the stream encoder 110 may be packetized by the packet generator/processor 108 and transmitted via the network interface(s) 104, as further described herein.

The stream decoder 112 may be configured to decode a media stream. For example, the stream decoder 112 may process audio, video, and/or text streams that may be provided by media sources in a variety of formats. The stream decoder 112 may perform functions such as format conversion, aspect ratio conversion, bitrate conversion, resolution conversion, color space conversion, etc. In a particular embodiment, the stream decoder 112 may decode a media stream that is generated by packet generator/processor 108 after processing a media stream received via the network interface(s) 104, as further described herein.

Examples of media formats supported by the stream encoder 110 and the stream decoder 112 include, but are not limited to, a hypertext transfer protocol (HTTP) live streaming (HLS) format that may be provided to iOS® devices (iOS is a registered trademark of Cisco Systems, Inc. of San Jose, Calif. and is used by Apple Inc. of Cupertino, Calif. under license), a HTTP dynamic streaming (HDS) format that may be provided to a device that is compatible with video for Adobe® Flash® (Adobe and Flash are registered trademarks of Adobe Systems Inc. of San Jose, Calif.), smooth streaming (e.g., an Internet Information Services (IIS) extension from Microsoft Corp. to implement adaptive bitrate streaming and provide media streams to devices running Microsoft® Silverlight® or other smooth streaming clients (Microsoft and Silverlight are registered trademarks of Microsoft Corp. of Redmond, Wash.)), and motion picture experts group (MPEG) dynamic adaptive streaming over HTTP (MPEG-DASH) (also known as international organization for standardization (ISO)/international electrotechnical commission (IEC) 23009-1). Additional audio formats, video formats, data formats and or coder/decoders (CODECs) may also be supported.

A media stream received by or transmitted by the media server 102 may be a single-channel or multi-channel bidirectional media stream (BMS). As used herein, a "bidirectional media stream" or "BMS" may have computing devices (e.g., servers, media players, etc.) as endpoints and may include one or more media messages and one or more protocol messages. Media messages may include a message body (e.g., raw serialized binary data) and a message header. The message header may include a message flags portion and a message fields portion. At least one flag in the message flags portion may have a value that indicates a length of a corresponding field in the message fields portion. For example, when a stream identifier (ID) flag has a first value (e.g., 0), a corresponding stream ID field in the message fields portion of the message header may have a first length (e.g., 1 byte). However, when the stream ID flag has a second value (e.g., 1), the stream ID field may have a second length (e.g., 4 bytes). The use of message flags may thus enable the use of variable length header fields, which may decrease an overall amount of overhead involved in transmitting the media messages. Additional illustrative examples of message flags and corresponding message fields are further described with reference to FIG. 6. It should be noted, however, that although bidirectional streams are described herein, a media communication protocol that uses header flags and variable-length header fields may also be used with unidirectional media streams.

Protocol messages may include a message body and a message header that is generated based on protocol data. Protocol messages may be sent periodically (e.g., based on a user-provided periodicity or a built in periodicity) to provide accounting information for messages sent and received by each endpoint of the BMS. For example, protocol messages may be sent every 250 messages or every 2.5 seconds. Protocol messages may include data that can be used to determine a relative "health" of the BMS. For example a protocol message may include status/accounting information, such as a number of messages sent from one endpoint of the BMS to the other endpoint of the BMS, a number of bytes sent from one endpoint of the BMS to the other endpoint of the BMS, etc. The status/accounting information may be compared to an expected or minimum number of message/bytes to determine connection health. Such a comparison may be used to verify, for example, that the data a sending device has sent up to that point in time has in fact been received by a receiving device.

For example, during setup of a connection (e.g., a transmission control protocol (TCP) connection) and BMS between two endpoints, a target or minimum message rate or data rate may be negotiated and agreed upon. To illustrate, a minimum rate of 100 messages per second may be agreed upon. A protocol message rate (e.g., every 2.5 seconds) may also be agreed upon. During media streaming, protocol messages may be sent every 2.5 seconds, where the protocol messages include a number of messages sent since the start of streaming or since the last protocol message. If a receiver notices that fewer than 250 messages (minimum of 100 message per second×2.5 second window=250 messages) have been received, the receiver may conclude that the health of the BMS has deteriorated and may take remedial action.

As another example, the receiver may conclude that the health of the BMS has deteriorated in response to determining that the protocol message was delayed (as determined by examining a timecode in the protocol message). In some embodiments, media messages and protocol messages may include either an absolute timecode or a relative timecode. An absolute timecode may represent an amount of time that has elapsed since an agreed upon epoch (i.e., a "zero" time). A relative timecode may represent an amount of time that has elapsed since a most recent occurrence of an event that resets a clock or timer to zero (e.g., an amount of time since a last message of the same type that had the same channel ID).

In a particular embodiment, the stream encoder 110, the stream decoder 112, and/or media players (e.g., at the viewing devices 140, 160, and 180) may be implemented to specifically support certain functions of the described protocol. For example, a state machine may be maintained at the media server 102 and the media players at the viewing devices 140, 160, and 180 to calculate relative and/or absolute timecodes.

The packet generator/processor 108 may be executable by the processor(s) 106 to perform various protocol level functions, such as generating packets to be transmitted via a BMS and processing packets received a BMS. For example, during transmission operations at the media server 102, the packet generator/processor 108 may determine whether data to be communicated to a destination computing device (e.g., one of the viewing devices 140, 160, or 180 via a corresponding BMS 150, 170 or 190, respectively) includes (or is) media data or protocol data. In response to determining that the data includes (or is) media data, the protocol generator/processor 108 may generate a message header and a message body based on the media data. The message header may include a header flags portion and a header fields portion, where the header flags portion includes at least one flag having a value that indicates a length of a corresponding field of a plurality of fields of the header fields portion. The protocol generator/processor 108 may also encapsulate the message header and the message body into a media message that is inserted into a BMS to the destination computing device.

As another example, during reception operations at the media server 102, the protocol generator/processor 108 may receive a message (e.g., from the publishing device 120 via a BMS 130) communicated as part of a media stream in accordance with a media communication protocol. The message may include a message header and a message body, and the message header may include a header flags portion and a header fields portion. The protocol generator/processor 108 may determine a length of a particular field of a plurality of fields in the header fields portion based on a value of a corresponding flag of the header flags portion, and may process the message based at least in part on the determined length of the particular field.

The system 100 of FIG. 1 may thus enable bidirectional communication of media streams and data associated therewith. Advantageously, such communication may utilize variable-length header fields and flags that indicate lengths of the variable-length header fields. The header flags may therefore be used to achieve header compression, which may reduce an overall amount of overhead involved with media stream communication. Using header flags and variable-length header fields may reduce network traffic and increase data throughput as compared to existing media communication protocols that have one or more fixed-length alternatives for headers (e.g., a "full" header, and one or more shorter headers that omit redundant data). Use of header flags and variable-length header fields on a per-packet basis, as described with reference to FIG. 1, may also be preferable to existing media communication protocols that break packets into chunks and add a header to each chunk (e.g., because the single header for the packet may be smaller than a sum of the sizes of each of the chunk headers and/or because less control processing may be involved for the packet).

Furthermore, use of bidirectional streams in the system 100 of FIG. 1 may simplify connection management and monitoring. For example, instead of monitoring multiple connections/streams, a single BMS may be monitored to determine aggregate upload and download metrics.

Figure 2:
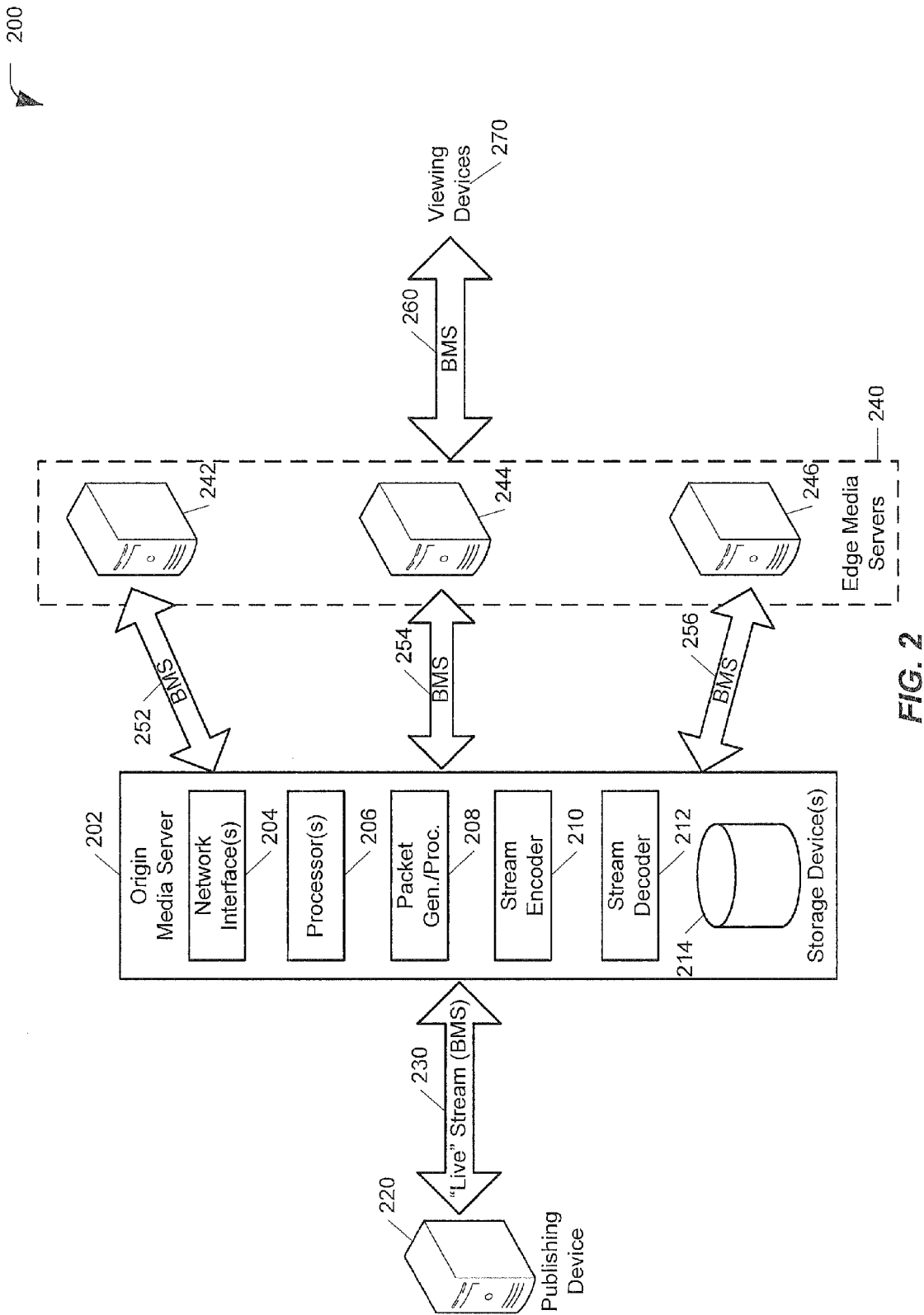
FIG. 2 is a diagram to illustrate a particular embodiment of a system that supports communication between an origin server and edge servers using message headers that include header flags.

FIG. 2 is a diagram to illustrate a particular embodiment of a system 200 that supports communication between an origin server and edge servers using message headers that include header flags. The system 200 of FIG. 2 may represent an origin-edge "pull" mechanism for video streaming.

The system 200 includes an origin media server 202. The origin media server 202 includes network interface(s) 204, processor(s) 206, a packet generator/processor 208, a stream encoder 210, a stream decoder 212, and storage device(s) 214, each of which may function as described with reference to corresponding components of the media server 102 of FIG. 1.

The origin media server 202 may receive a BMS 230 from a publishing device 220, where the BMS 230 is associated with a "live" stream of audio, video, and/or text content (e.g., a video stream of a live sporting event). As described above with reference to FIG. 1, the BMS 230 may utilize message headers that include message flags and variable-length header fields.

The origin media server 202 may perform stream processing (e.g., encoding or transcoding) and protocol-level functions with respect to the received BMS 230 to generate output data to be provided to one or more edge media servers 240. For example, the edge media servers 240 may "pull" media content from the origin media server 202 and may be used for redundancy and load balancing purposes when the live stream provided by the publishing device 220 is in high demand by viewing devices 270. In the embodiment of FIG. 2, the origin media server 202 provides a copy of the live stream from the publishing device 220 to a first edge media server 242 via a first server-to-server BMS 252, to a second edge media server 244 via a second sever-to-server BMS 254, and to a third edge media server 246 via a third server-to-server BMS 256. Each destination viewing device 270 may receive the live stream via a corresponding BMS 260 from one or more of the edge media servers 240. In an alternate embodiment, encoding/transcoding may be performed at the edge media servers 240 instead of at the origin media server 202.

The system 200 of FIG. 2 may thus support bidirectional communication of media streams, including server-to-server communication. In addition, by using a communication protocol that involves the use of header flags and variable-length header fields, the system 200 of FIG. 2 may decrease overhead and increase throughput of such server-to-server communication.

Figure 3:
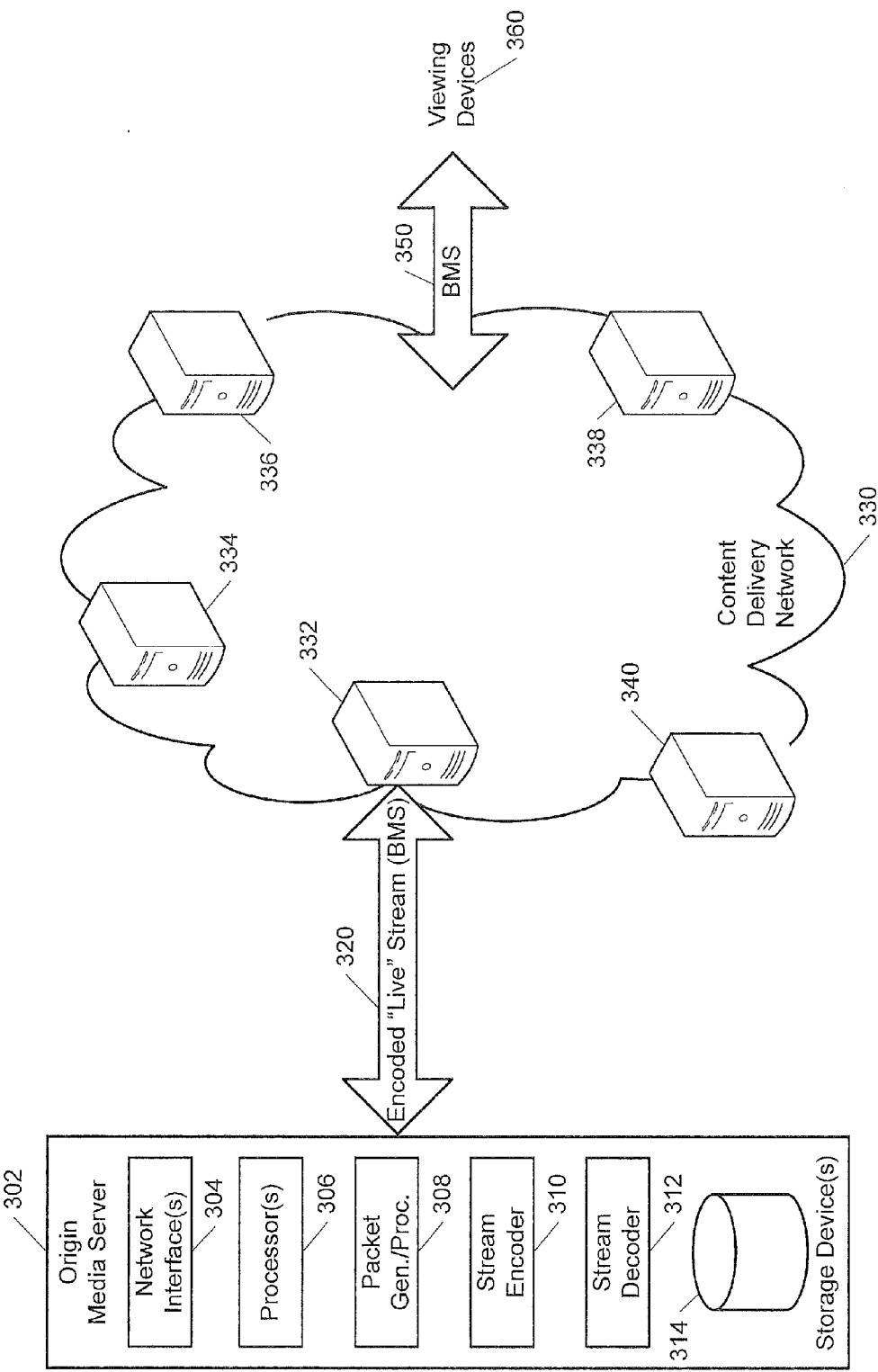
FIG. 3 is a diagram to illustrate a particular embodiment of a system that supports communication between an origin server and a content delivery network using message headers that include header flags.

FIG. 3 is a diagram to illustrate a particular embodiment of a system 300 that supports communication between an origin server and a content delivery network (CDN) using message headers that include header flags. The system 300 of FIG. 3 may represent an origin-CDN "push" mechanism for video streaming. In alternate embodiments, a CDN "pull" mechanism may also be supported (e.g., a CDN may "pull" data from an origin media server).

The system 300 includes an origin media server 302. The origin media server 302 includes network interface(s) 304, processor(s) 306, a packet generator/processor 308, a stream encoder 310, a stream decoder 312, and storage device(s) 314, each of which may function as described with reference to corresponding components of the media server 102 of FIG. 1.

The origin media server 302 may receive media content from one or more publishing devices (e.g., via a "live" stream of such media content). As described above with reference to FIG. 2, the "live" stream may be received via a BMS 230 that utilizes message headers including message flags and variable-length header fields.

The origin media server 302 may perform stream processing (e.g., encoding or transcoding) and protocol-level functions with respect to the received stream to generate output data to be provided (e.g., "pushed") to a CDN 330 via a server-to-CDN BMS 320. For example, various servers (e.g., illustrative servers 332, 334, 336, 338 and 340) of the CDN 330 may be used for redundancy and load balancing (e.g., geographic load-balancing) purposes. In a particular embodiment, server-to-server communication with the CDN 330 may be implemented using BMSs as described herein. Destination viewing devices 360 may receive the live stream via corresponding BMS 350 from the CDN 330 (e.g., from a server 332-340 within the CDN 330).

The system 300 of FIG. 3 may thus support bidirectional communication of media streams, including server-to-CDN communication. In addition, the use of a communication protocol that involves the use of header flags and variable-length header fields may decrease overhead and increase throughput of such server-to-CDN communication.

Figure 4:
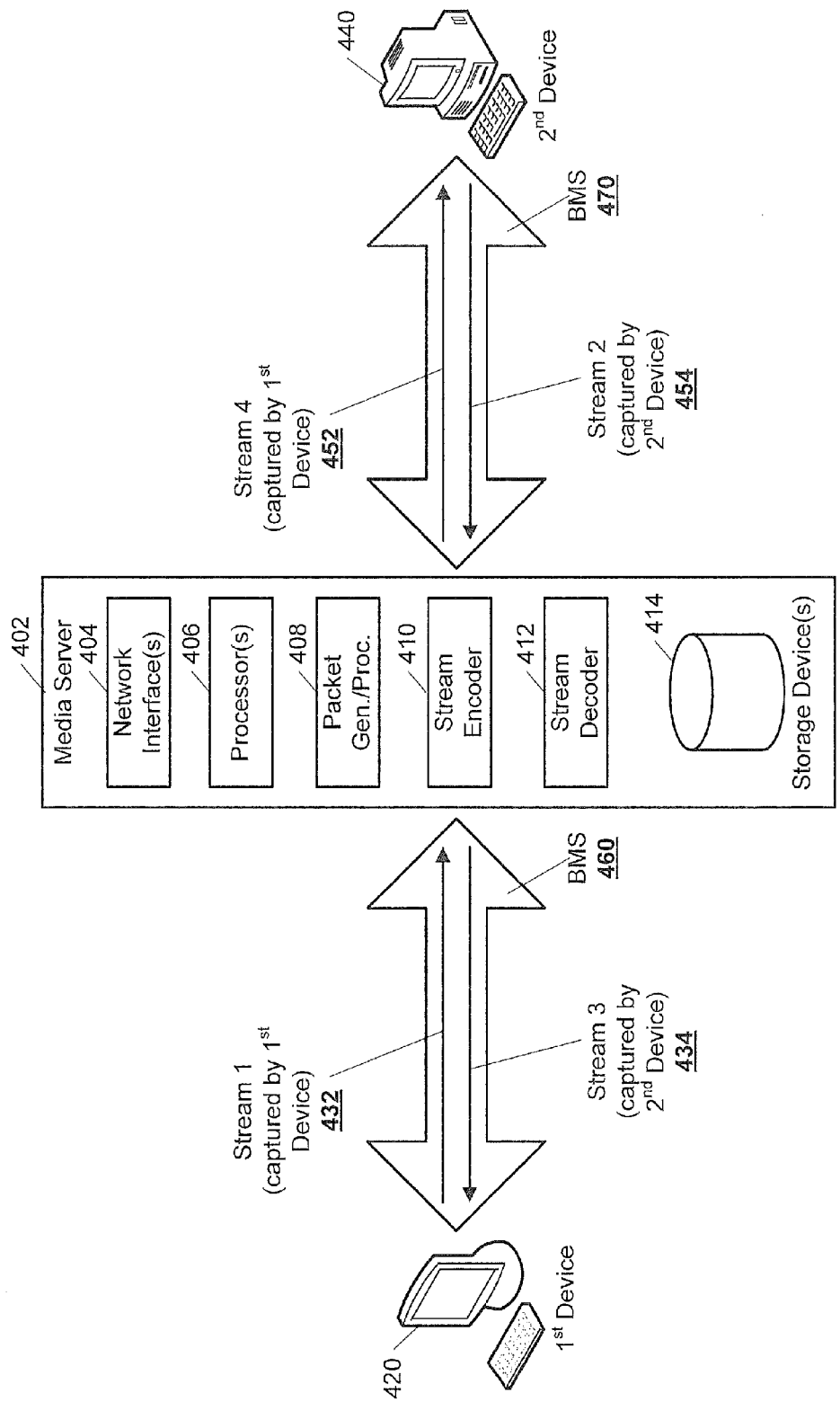
FIG. 4 is a diagram to illustrate a particular embodiment of an N-way conference using a media server of any of FIGS. 1-3.

It will be appreciated that FIGS. 1-3 are described with respect to devices that are either publishing devices or viewing devices. However, this is for illustration only. In particular embodiments, devices may function as both publishers as well as viewers. For example, N-way conferencing may occur between N users, where each of the N users has a computing device that can capture/transmit a stream and receive/display N–1 streams from the other N–1 users, where N is an integer greater than 1. FIG. 4 is a diagram to illustrate a particular embodiment of such an N-way conference, and is generally designated 400. In the illustration of FIG. 4, N is equal to 2. That is, a media server 402 implements a two-way conference between a first device 420 and a second device 440. Although N equal to 2 is illustrated for ease of explanation, it should be noted that N may alternately be greater than 2.

The media server 402 includes network interface(s) 404, processor(s) 406, a packet generator/processor 408, a stream encoder 410, a stream decoder 412, and storage device(s) 414, each of which may function as described with reference to corresponding components of the media server 102 of FIG. 1.

During operation, the first device 420 may capture media data (e.g., via a camera and/or microphone at the first device 420) and transmit a first stream 432 to the media server 402. The first stream 432 may be transmitted using a first BMS 460. As described above with reference to FIG. 1, the first BMS 460 may support such real time media streaming and may utilize message headers that include message flags and variable-length header fields. Similarly, the second device 440 may capture media data and transmit a second stream 454 to the media server 402 using a second BMS 470. The media server 402 may perform real time stream processing operations on the first stream 432 and/or the second stream 454 to generate a third stream 434 and/or a fourth stream 452. The third stream 434 may be provided to the first device 420 using the first BMS 460 and the fourth stream 452 may provided to the second device 440 using the second BMS 470.

In a particular embodiment where the conference is an audio/video conference, the BMSs 460, 470 used in FIG. 4 may each have two channels: an audio channel and a video channel. When non-audio and non-video data is communicated (e.g., one of the conference participants initiates a text messaging session or a whiteboard sharing session), an additional channel may be established for such non-audio/non-video data. Alternately, the BMSs 460, 470 may include a single channel that interleaves audio data, video data, and the additional data for the text messaging/whiteboard sharing. The system 400 of FIG. 4 may thus enable real-time N-way audio/video/data conferencing using bidirectional media streams.

Figure 5:
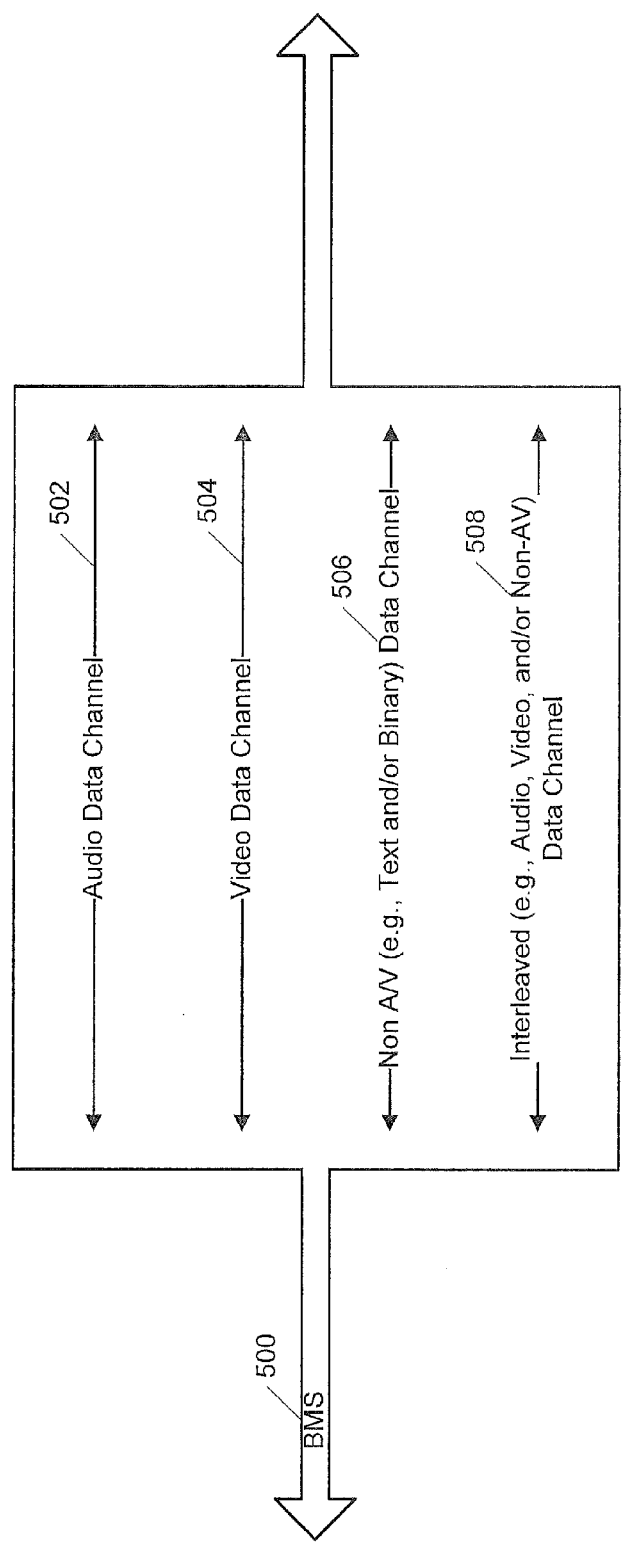
FIG. 5 is a diagram to illustrate a particular embodiment of a bidirectional media stream of any of FIGS. 1-4.

FIG. 5 is a diagram to illustrate a particular embodiment of a bidirectional media stream (BMS) 500. As described above, a BMS may include one or more channels. For example, the BMS 500 may include an audio data channel 502 that carries only audio data, a video data channel 504 that carries only video data, and a non A/V channel 506 that carries one or more other kinds of data (e.g., text data and/or binary data). Alternately, or in addition, the BMS 500 may include one or more interleaved channels 508 that interleave different kinds of data. In some embodiments, each BMS may be associated with a particular stream ID. To enable a receiver to distinguish between multiple channels of a single stream, each media message may include a channel ID in addition to a stream ID, as further described with reference to FIG. 6.

It should be noted that other types of data may also be communicated via the BMS 500. For example, a first device may use the BMS 500 to send a remote procedure call (RPC) to a second device to trigger an operation (e.g., procedure call) at the second device. For example, during a live video stream of a reality television show, a source device may send a remote procedure call to a viewing device to cause the viewing device to display an overlay that enables a viewer to vote for contestants on the reality television show.

Figure 6:
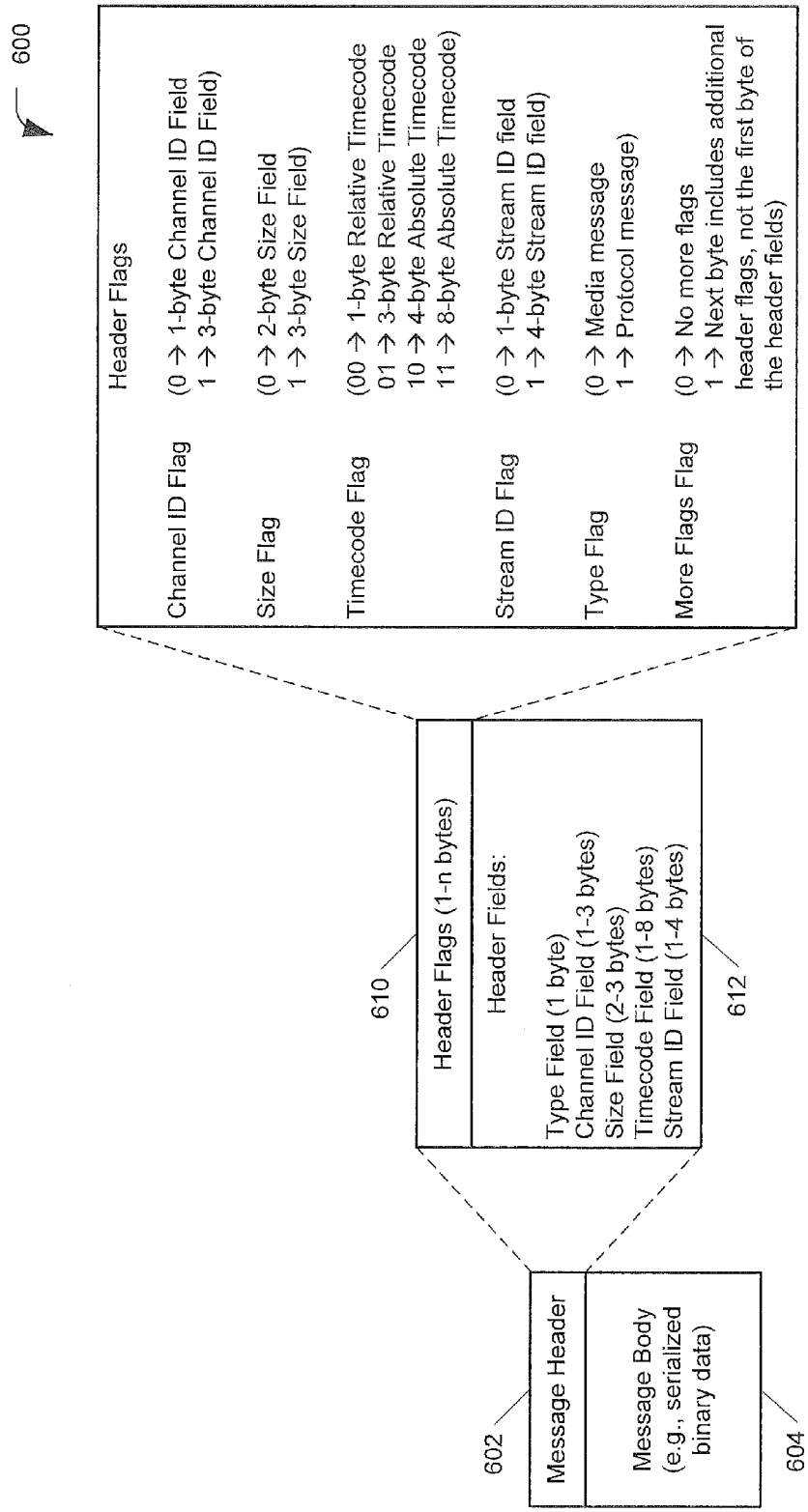
FIG. 6 is a diagram to illustrate a particular embodiment of a message header that includes a header flags portion and a header fields portion.

FIG. 6 is a diagram to illustrate a particular embodiment 600 of a media message that includes a message header 602 having a header flags portion 610 and a header fields portion 612. For example, a media message may include the message header 602 and a message body 604. The message body 604 may include serialized binary data that represents audio, video, and/or data. In a particular embodiment, the media message may be communicated via a BMS, as described with reference to FIGS. 1-5. It should be noted that the ordering of header flags and header fields in FIG. 6 is for illustration only and that one or more other orders may be implemented.

The header flags portion 610 may include one or more header flags that indicate lengths of corresponding fields in the header fields portion 612. The header flags portion 610 may also include one or more flags that do not have a corresponding field in the header fields portion 612. Values of the header flags may be used by a receiver to parse the message header 602.

For example, a first value (e.g., 0) of a single-bit channel ID flag may indicate that a corresponding channel ID field in the header fields portion 612 has a first length (e.g., 1 byte). A second value (e.g., 1) of the channel ID flag may indicate that the channel ID field has a second length (e.g., 3 bytes).

A first value (e.g., 0) of a single-bit size flag may indicate that a corresponding size field in the header fields portion 612 has a first length (e.g., 2 bytes). A second value (e.g., 1) of the size flag may indicate that the size field has a second length (e.g., 3 bytes).

A first value (e.g., 00) of a two-bit timecode flag may indicate that a corresponding timecode field in the header fields portion 612 is a relative timecode and has a first length (e.g., 1 byte). A second value (e.g., 01) of the timecode flag may indicate that the timecode field is a relative timecode and has a second length (e.g., 3 bytes). A third value (e.g., 10) of the timecode flag may indicate that the timecode field is an absolute timecode and has a third length (e.g., 4 bytes). A fourth value (e.g., 11) of the timecode flag may indicate that the timecode field is an absolute timecode and has a fourth length (e.g., 8 bytes).

A first value (e.g., 0) of a single-bit stream ID flag may indicate that a corresponding stream ID field in the header fields portion 612 has a first length (e.g., 1 byte). A second value (e.g., 1) of the stream ID flag may indicate that the stream ID field has a second length (e.g., 4 bytes).

A first value (e.g., 0) of a single-bit type flag may indicate that the message that includes the message header 602 and the message body 604 is a media message (i.e., includes media data). A second value (e.g., 1) of the type flag may indicate that the message is a protocol message (i.e., includes protocol data).

In a particular embodiment, the header flags portion 610 may implement an optional extension mechanism (e.g., so that one or more additional header flags may be accommodated). To illustrate, the header flags portion 610 may include a "more flags" flag. When the "more flags" flag has a first value (e.g., 0), the header flags portion 610 may not include any additional flags (i.e., the header flags portion 610 may have a first size). Conversely, when the "more flags" flag has a second value (e.g., 1), the header flags portion 610 may occupy an extra byte or other unit of space (i.e., the header flags portion 610 may have a second size) to accommodate additional flags. The "more flags" flag having the second value may also indicate that the header fields portion 612 occupies extra space to accommodate additional fields corresponding to the additional flags.

Figure 7:
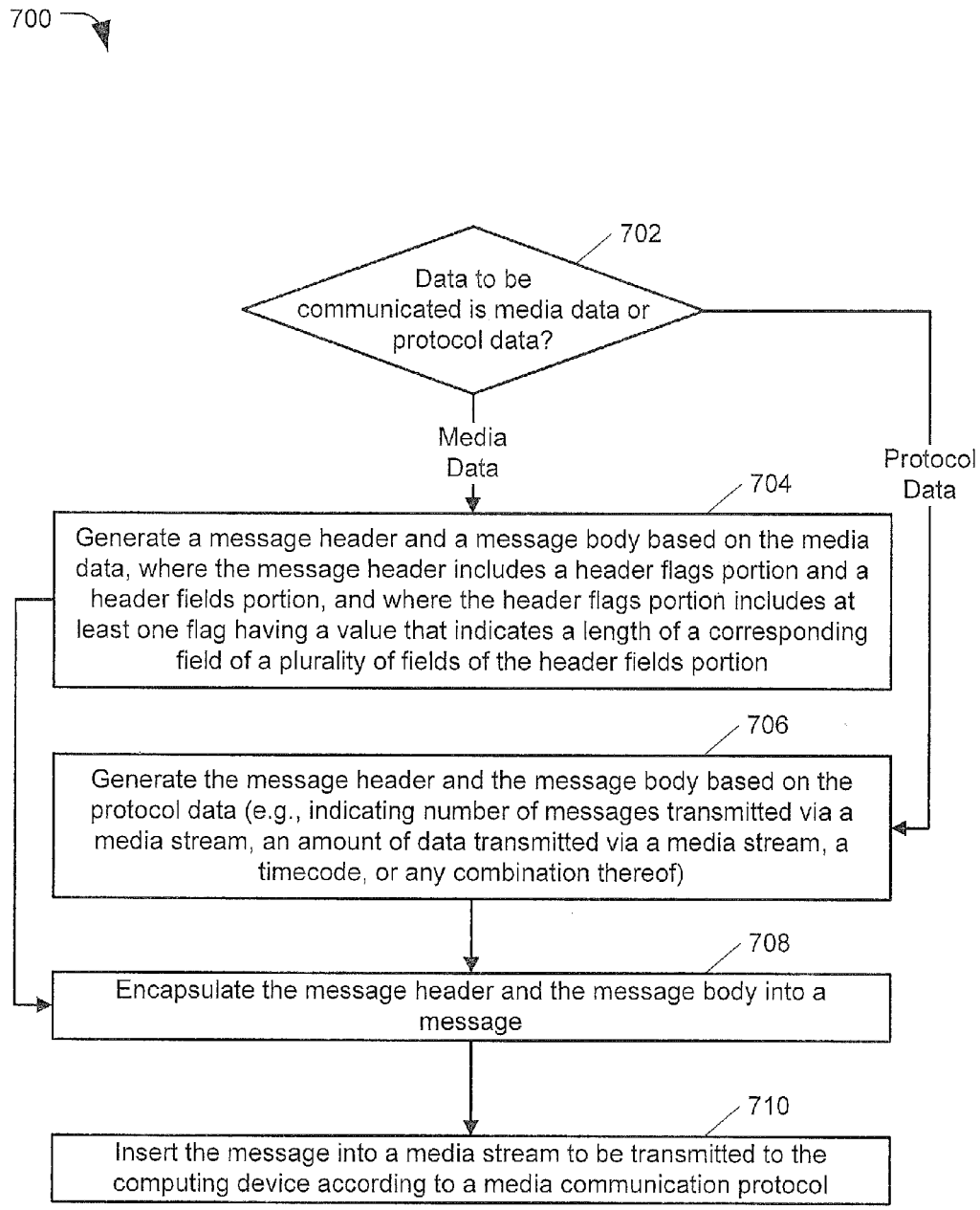
FIG. 7 is a flowchart to illustrate a particular embodiment of a method of generating a message that includes a message header having message flags.

FIG. 7 is a flowchart to illustrate a particular embodiment of a method 700 of generating a message that includes a message header having message flags. In an illustrative embodiment, the method 700 may be performed by the systems of FIGS. 1-4.

The method 700 includes determining whether data to be communicated is media data or protocol data, at 702. For example, in FIG. 1, the packet generator/processor 108 may determine whether data to be communicated to one of the viewing devices 140, 160, or 180 is protocol data or media data.

When the data to be communicated is media data, the method 700 may include generating a message header and a message body based on the media data, at 704. The message header includes a header flags portion and a header fields portion, where the header flags portion includes at least one flag having a value that indicates a length of a corresponding field of a plurality of fields of the header fields portion. For example, in FIG. 1, the packet generator/processor 108 may generate a message header and a message body. In an illustrative embodiment, the message header and the message body may be formatted as described with reference to FIG. 6.

When the data to be communicated is protocol data, the method 700 may include generating the message header and the message body based on the protocol data, at 706. The protocol data may indicate number of messages transmitted via a media stream (e.g., a BMS), an amount of data transmitted via a media stream (e.g., a BMS), a timecode, one or more other network health metrics, or any combination thereof. In a particular embodiment, similar to a media message, a protocol message may also include one or more header flag having values that indicate a size of one or more corresponding header fields. For example, protocol messages may also include a channel ID flag, a stream ID flag, a timecode flag, etc.

The method 700 may also include encapsulating the message header and the message body into a message, at 708, and inserting the message into a media stream to be transmitted to a computing device according to a media communication protocol, at 710. For example, in FIG. 1, the message may be transmitted to one of the viewing devices 140, 160, or 180 via the corresponding BMS 150, 170, or 190.

Figure 8:
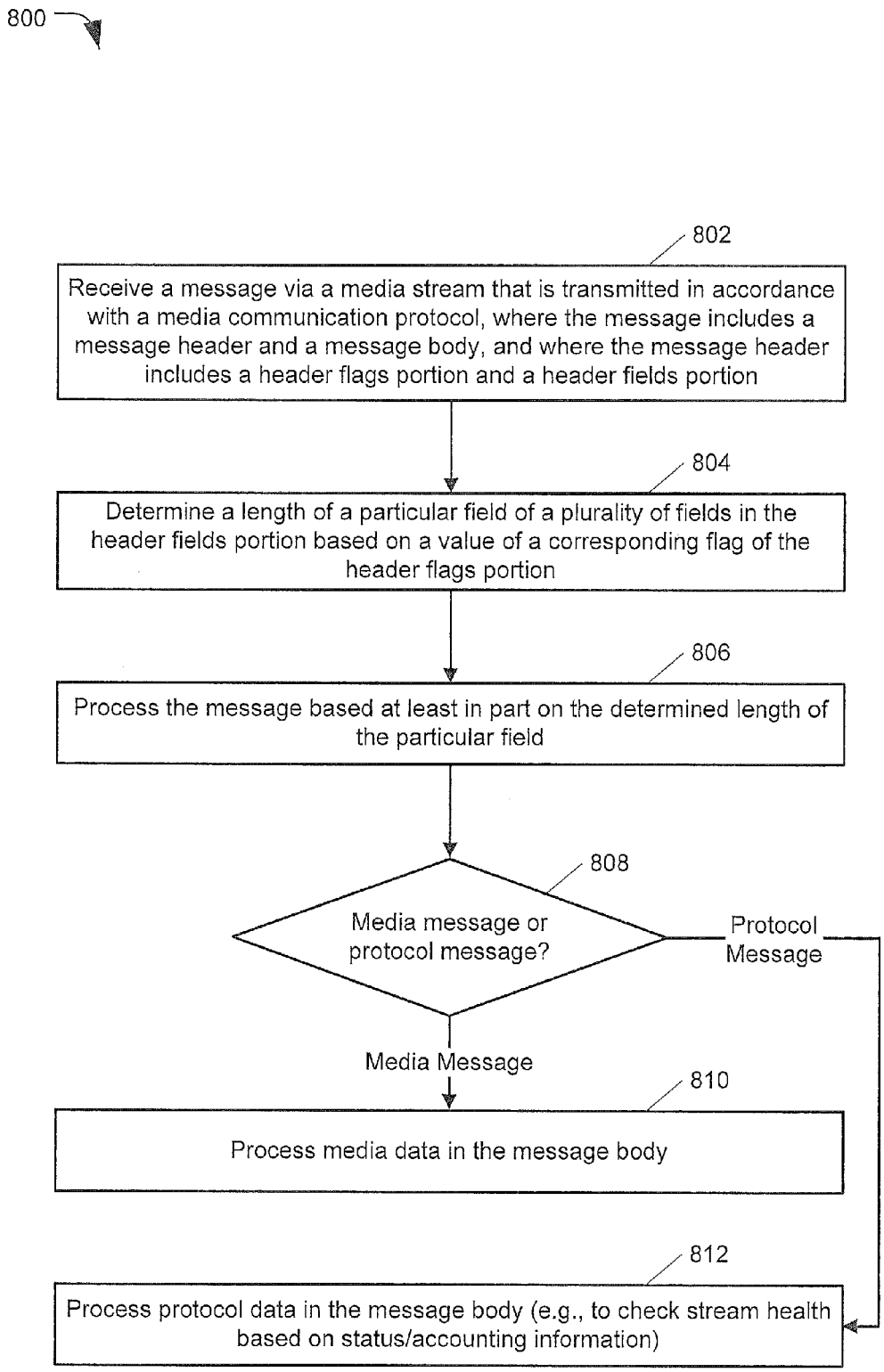
FIG. 8 is a flowchart to illustrate a particular embodiment of a method of receiving a message that includes a message header having message flags.

FIG. 8 is a flowchart to illustrate a particular embodiment of a method 800 of receiving a message that includes a message header having message flags. In an illustrative embodiment, the method 800 may be performed by the systems of FIGS. 1-4.

The method 800 includes receiving a message via a media stream that is transmitted in accordance with a media communication protocol, at 802. The message includes a message header and a message body, and the message header includes a header flags portion and a header fields portion. For example, in FIG. 1, the media server 102 may receive a message from the publishing device 120 via the BMS 130. In an illustrative embodiment, the message header and message body may be formatted as described with reference to FIG. 6.

The method 800 may also include determining a length of a particular field of a plurality of fields in the header fields portion based on a value of a corresponding flag of the header flags portion, at 804. For example, in FIG. 1, the packet generator/processor 108 may determine a length of a header field based on a value of a corresponding header flag.

The method 800 may further include processing the message based at least in part on the determined length of the particular field, at 806. For example, in FIG. 1, the packet generator/processor 108 may process (e.g., parse) the message based on the determined length. To illustrate, the packet generator/processor 108 may parse the message to identify a type flag that indicates whether the message is a media message or a protocol message.

The method 800 may include determining (e.g., based on the type flag), whether the message is a media message or a protocol message, at 808. When it is determined that the message is a media message, the method 800 may include processing media data (e.g., serialized binary data representing audio and/or video content) in the message body, at 810. When it is determined that the message is a protocol message, the method 800 may include processing protocol data (e.g., status/accounting information) in the message body. For example, the status/accounting information may indicate how many messages or bytes of data were communicated via the media stream during a particular interval of time. The status/accounting information may be compared with an expected or minimum number of messages or bytes of data to determine a relative "health" of the media stream (e.g., whether the stream is experiencing adverse network communication conditions). Media data and protocol data may be processed by the same processor/processing module or by different processors/processing modules.

Figure 9:
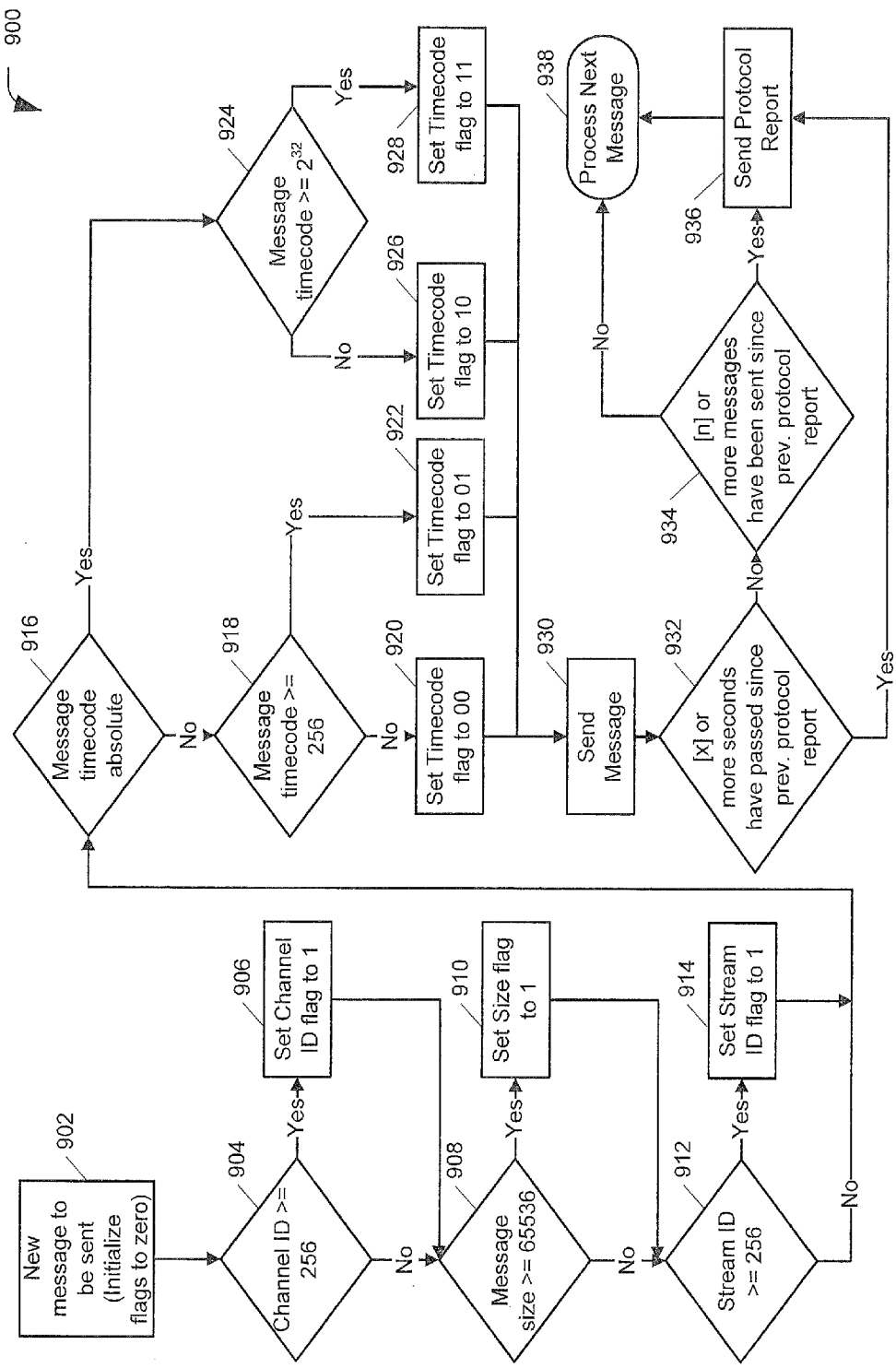
FIG. 9 is a flowchart to illustrate a particular embodiment of a method of setting values of message flags.

FIG. 9 is a flowchart to illustrate a particular embodiment of a method 900 of setting values of message flags (e.g., flags in the message flags portion 610 of FIG. 6).

The method 900 includes identifying or receiving a new message to be sent, at 902. When a new message is identified or received, all message flags may be initialized to a default value (e.g., 0).

The method 900 also includes determining whether a channel ID associated with the message is greater than or equal to a first threshold (e.g., 256), at 904, and if so, setting a channel ID flag to 1, at 906. The method 900 further includes determining whether a size of the message is greater than or equal to a second threshold (e.g., 65,536), at 908, and if so, setting a size flag to 1, at 910. The method 900 includes determining whether a stream ID associated with the message is greater than or equal to a third threshold (e.g., 256), at 912, and if so, setting a stream ID flag to 1, at 914

The method 900 also includes determining whether a message timecode is absolute, at 916. If the message timecode is not absolute, i.e., is relative, the method 900 includes determining if the relative timecode is greater than or equal to a fourth threshold (e.g., 256), at 918. If the relative timecode is not greater than or equal to the fourth threshold, the method 900 includes setting a timecode flag to 00, at 920. If the relative timecode is greater than or equal to the fourth threshold, the method 900 includes setting the timecode flag to 01, at 922.

If the message timecode is absolute, the method 900 includes determining whether the message timecode is greater than or equal to a fifth threshold (e.g., $2^{32}$=4,294,967,296), at 924. If the absolute timecode is not greater than or equal to the fifth threshold, the method 900 includes setting the timecode flag to 10, at 926. If the absolute timecode is greater than or equal to the fifth threshold, the method 900 includes setting the timecode flag to 11, at 928.

Advancing to 930, the method 900 may include sending the message at 930. At 932, the method 900 may include determining whether a particular number of seconds (e.g., "x" seconds) have passed since a previous protocol report, at 932. If so, the method 900 may include sending a protocol report (e.g., a protocol message), at 936. If the particular number of seconds has not passed since the previous protocol report, the method 900 includes determining whether a particular number of messages (e.g., "n" messages) has been sent since the previous protocol report, at 934. If so, a protocol report may be sent, at 936.

Advancing to 938, the method 900 may process a next message to be sent. For example, such processing of a next message may include returning from 938 back to 902.

It will be appreciated that, as illustrated in FIGS. 6 and 9, the header fields may usually have the smaller of two or more potential sizes. For example, because most packets may be less than 65,536 bytes in length, most timecodes may be less than 255 milliseconds, etc., a smaller amount of space may used to represent the size field, the timecode field, etc. Thus, smaller field sizes may be designed to be the norm, which may decrease overhead associated with real-time media streaming.

In accordance with various embodiments of the present disclosure, one or more methods, functions, and modules described herein may be implemented by software programs executable by a computer system. Further, in an embodiment, implementations can include distributed processing, component/object distributed processing, and/or parallel processing. In an embodiment, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the publishing device 102 of FIG. 1, the media server 102 of FIG. 1, the viewing devices 140, 160, or 180 of FIG. 1, the publishing device 220 of FIG. 2, the origin media server 202 of FIG. 2, the edge media servers 240 of FIG. 2, the viewing devices 270 of FIG. 2, the origin media server 302 of FIG. 3, the content delivery network 330 of FIG. 3 (or servers thereof), the viewing devices 360 of FIG. 3, the first device 420 of FIG. 4, the media server 402 of FIG. 4, the second device 440 of FIG. 4, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In conjunction with the described embodiments, a method includes determining, at a first computing device, whether data to be communicated to a second computing device includes media data or protocol data. The method also includes, in response to determining that the data includes media data, generating a message header and a message body based on the media data. The message header includes a header flags portion and a header fields portion, and the header flags portion includes at least one flag having a value that indicates a length of a corresponding field of a plurality of fields of the header fields portion. The method further includes encapsulating the message header and the message body into a message and inserting the message into a media stream to be transmitted from the first computing device to the second computing device in accordance with a media communication protocol.

In another particular embodiment, an apparatus includes a processor and a media server executable by the processor to determine whether data to be communicated to a computing device includes media data or protocol data. The media server is also executable by the processor to, in response to determining that the data includes media data, generate a message header and a message body based on the media data. The message header includes a header flags portion and a header fields portion, where the header flags portion includes at least one flag having a value that indicates a length of a corresponding field of a plurality of fields of the header fields portion. The media server is further executable by the processor to encapsulate the message header and the message body in a message and to insert the message into a media stream to be transmitted to the computing device.

In another particular embodiment, a computer-readable storage device includes instructions that, when executed by a computer, cause the computer to receive a message communicated as part of a media stream in accordance with a media communication protocol. The message includes a message header and a message body, where the message header includes a header flags portion and a header fields portion. The instructions, when executed by the computer, also cause the computer to determine a length of a particular field of a plurality of fields in the header fields portion based on a value of a corresponding flag of the header flags portion. The instructions, when executed by the computer, further cause the computer to process the message based at least in part on the determined length of the particular field.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
generating, by a first computing device, a message header and a message body, wherein the message header comprises a header flags portion and a header fields portion, wherein the header flags portion corresponds to a first contiguous portion of the message header, wherein the header fields portion corresponds to a second contiguous portion of the message header that is non-overlapping with respect to the first contiguous portion, wherein the header flags portion includes a first flag of a plurality of flags and a second flag of the plurality of flags, wherein the first flag corresponds to a first field of a plurality of fields of the header fields portion, wherein the first flag has a value indicating a length of the first field, wherein the second flag indicates whether the header flags portion has a first size or a second size, and wherein the second size of the header flags portion is greater than the first size of the header flags portion; and
inserting, by the first computing device, a message including the message header and the message body into a media stream to be transmitted from the first computing device to a second computing device.

2. The method of claim 1, wherein at least one channel of the media stream includes audio data.

3. The method of claim 1, wherein at least one channel of the media stream includes video data.

4. The method of claim 1, wherein at least one channel of the media stream includes data other than audio data and video data.

5. The method of claim 1, wherein at least one channel of the media stream comprises interleaved audio and video data.

6. The method of claim 1, wherein:
the header flags portion of the message header includes a channel identifier (ID) flag,
a first value of the channel ID flag indicates that a corresponding channel ID field in the header fields portion of the message header has a first length, and
a second value of the channel ID flag indicates that the corresponding channel ID field has a second length.

7. The method of claim 1, wherein:
the header flags portion of the message header includes a size flag, a first value of the size flag indicates that a corresponding size field in the header fields portion of the message header has a first length, and
a second value of the size flag indicates that the corresponding size field has a second length.

8. The method of claim 1, wherein:
the header flags portion of the message header includes a timecode flag,
a first value of the timecode flag indicates that a corresponding timecode field in the header fields portion of the message header includes a relative timecode having a first length,
a second value of the timecode flag indicates that the corresponding timecode field includes the relative timecode having a second length,
a third value of the timecode flag indicates that the corresponding timecode field includes an absolute timecode having a third length, and
a fourth value of the timecode flag indicates that the corresponding timecode field includes the absolute timecode having a fourth length.

9. The method of claim 1, wherein:
the header flags portion of the message header includes a stream identifier (ID) flag,
a first value of the stream ID flag indicates that a corresponding stream ID field in the header fields portion of the message header has a first length, and
a second value of the stream ID flag indicates that the corresponding stream ID field has a second length.

10. The method of claim 1, wherein:
the header flags portion of the message header includes a message type flag,
a first value of the message type flag indicates that the message includes media data, and
a second value of the message type flag indicates that the message includes protocol data.

11. The method of claim 1, wherein the first computing device comprises a first media server.

12. The method of claim 11, wherein the second computing device comprises a second media server.

13. The method of claim 1, wherein one of the first computing device or the second computing device comprises a media server, and wherein the other of the first computing device or the second computing device comprises a device configured to publish media content to the media server, a device configured to play media content received from the media server, or any combination thereof.

14. The method of claim 1, wherein at least one of the first computing device or the second computing device is associated with a content delivery network (CDN).

15. The method of claim 1, further comprising:
in response to determining that data to be sent to the second computing device comprises protocol data, generating the message header and the message body based on the protocol data,
wherein the protocol data indicates a number of messages transmitted from the first computing device to the second computing device via the media stream, an amount of data transmitted from the first computing device to the second computing device via the media stream, a timecode of the message, or any combination thereof.

16. The method of claim 1, wherein the media stream comprises a bidirectional media stream.

17. An apparatus comprising:
a processor; and
a media server executable by the processor to:
generate a message header and a message body, wherein the message header comprises a header flags portion and a header fields portion, wherein the header flags portion corresponds to a first contiguous portion of the message header, wherein the header fields portion corresponds to a second contiguous portion of the message header that is non-overlapping with respect to the first contiguous portion, wherein the header flags portion includes a first flag of a plurality of flags and a second flag of the plurality of flags, wherein the first flag corresponds to a first field of a plurality of fields of the header fields portion, wherein the first flag has a value indicating a length of the first field, wherein the second flag indicates whether the header flags portion has a first size or a second size, and wherein the second size of the header flags portion is greater than the first size of the header flags portion; and
insert a message including the message header and the message body into a media stream to be transmitted to a computing device.

18. The apparatus of claim 17, wherein the media server is further executable by the processor to encode a received media stream to generate media data.

19. The apparatus of claim 17, wherein the media server is further executable by the processor to implement an N-way conference between N computing devices, wherein each of the N computing devices transmits a corresponding media stream to the media server and receives N−1 media streams from the media server, wherein N is an integer greater than one.

20. A computer-readable storage memory comprising instructions that, when executed by a computer, cause the computer to:
receive a message communicated as part of a media stream in accordance with a media communication protocol, wherein the message includes a message header and a message body, wherein the message header comprises a header flags portion and a header fields portion, wherein the header flags portion corresponds to a first contiguous portion of the message header, wherein the header fields portion corresponds to a second contiguous portion of the message header that is non-overlapping with respect to the first contiguous portion; wherein the header flags portion includes a first flag of a plurality of flags and a second flag of the plurality of flags, wherein the first flag corresponds to a first field of a plurality of fields of the header fields portion, wherein the second flag indicates whether the header flags portion has a first size or a second size, and wherein the second size of the header flags portion is eater than the first size of the header flags portion;
determine a length of the first field based on a value of the first flag; and
process the message based at least in part on the determined length of the first field.

* * * * *